Feb. 19, 1946.  J. D. EISLER ET AL  2,394,990
RECORDING SYSTEM IN SEISMIC SURVEYING
Filed Oct. 30, 1937  4 Sheets-Sheet 1

Inventors
Joseph Daniel Eisler
Joseph Audley Sharpe
BY
Geo. L. Parkhurst
ATTORNEY Feb. 19, 1946.        J. D. EISLER ET AL        2,394,990
            RECORDING SYSTEM IN SEISMIC SURVEYING
                Filed Oct. 30, 1937      4 Sheets-Sheet 4

Inventors:—
Joseph Daniel Eisler
Joseph Audley Sharpe
BY
Geo. L. Parkhurst
ATTORNEY Patented Feb. 19, 1946

2,394,990

UNITED STATES PATENT OFFICE 2,394,990

RECORDING SYSTEM IN SEISMIC SURVEYING

Joseph Daniel Eisler and Joseph Audley Sharpe, Los Angeles, Calif., assignors, by mesne assignments, to Stanolind Oil and Gas Company, Tulsa, Okla., a corporation of Delaware Application October 30, 1937, Serial No. 171,846

13 Claims. (Cl. 234—1.5)

This invention pertains to the field of geophysical prospecting. More particularly it applies to improvements in recording systems for reflection seismic prospecting, whereby the position and slope of geological strata can be more readily determined than was formerly possible.

In the usual method of reflection seismic prospecting, a small charge of explosive is detonated slightly below the surface of the earth, and a record is made of the responses of a number of seismometers placed at advantageous positions near the shot hole to the refracted and reflected waves produced by the explosion and modified by the strata below the shot. Usually the seismometers are placed in one or more lines, so that the refracted and reflected waves will actuate them in a regular sequence. From the time between the explosion and the instant the reflected waves actuate the instruments, and from the interval between the time the first and last instruments are affected the depths and dips of the reflecting strata can be determined in a manner well known to the art.

The improved recording system of our invention can best be explained by the aid of the accompanying drawings which form a part of the specification and are to be read in connection with it. In these drawings like reference numerals in different drawings refer to the same or corresponding parts.

Figure 1:
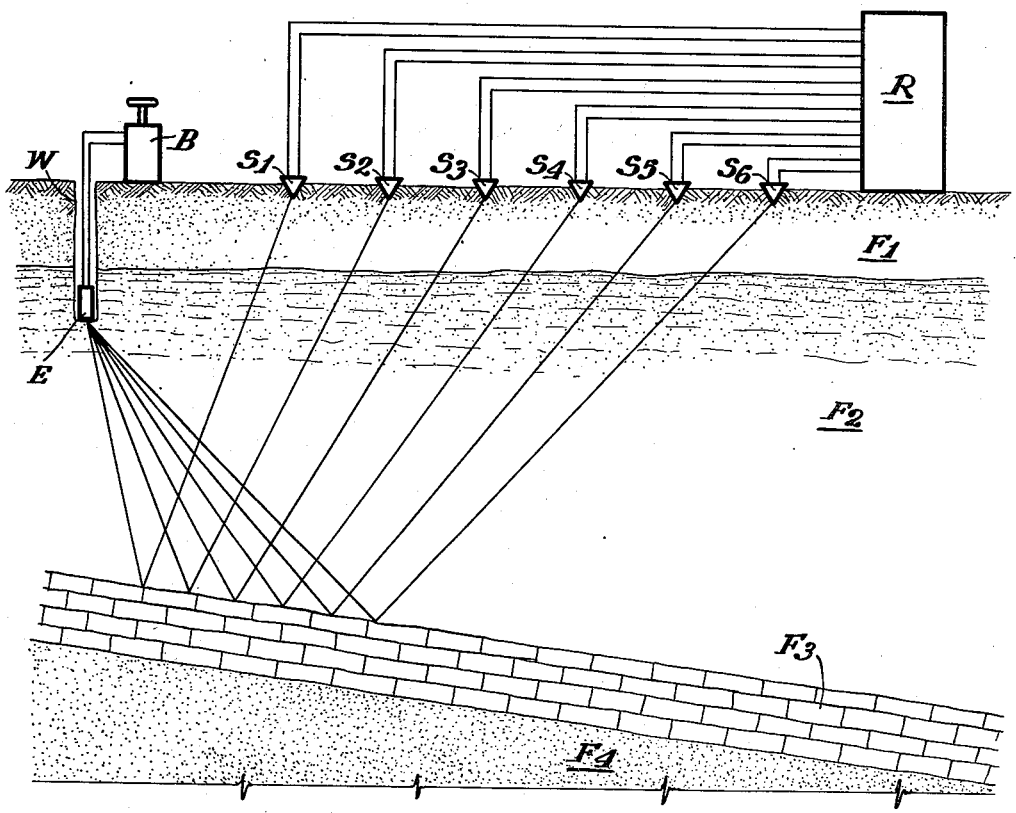
Figure 1 is a diagrammatic cross-section of a portion of the earth's crust, showing a shot hole, array of instruments, and the paths of certain of the seismic waves which actuate the seismometers.

Referring now to Figure 1, a simplified setup is shown. The paths of the seismic waves resulting from detonation of charge E in hole W by blaster B which are reflected from a reflecting bed $F_3$ back to seismometers $S_1 \ldots S_6$ are shown. It is obvious from this figure that the waves will arrive at all six seismometers at nearly the same time, but that $S_1$ will be actuated first, and that there will be a definite short time interval before the reflected waves from bed $F_3$ will actuate seismometer $S_6$. This difference in time between actuation of the first and last seismometers (known as the moveout) is due to the difference in lengths of paths traveled, and is a definite function of the depth and dip of the reflecting formation $F_3$. It is well known in the art that by a knowledge of the positions of the first and last seismometers, the velocity of seismic waves in the various formations below the shot hole, the time for the compressional wave to traverse the path from shot hole to seismometers, and the moveout, the depths and dips of the reflecting beds can be computed accurately.

In order to determine the two intervals of time just mentioned, i. e. the total travel time and the moveout, the response of the seismometers is amplified and recorded on a multi-element oscillograph recorder R, usually in the form of traces on a strip of photographic paper, on which is simultaneously printed a timing indication. The detonating impulse is also recorded to give the time of explosion. One popular timing indicator is in the form of narrow lines transverse to the motion of the film, printed on the record every 0.01 second. From the resultant record (such as the simplified sample shown in Figure 2) the time $T_r$ between the explosion and response of the instruments and the moveout ($\Delta T$) can be obtained.

It is an object of this invention to facilitate the distinguishing of reflected waves by use of a new kind of recording system. It is a further object to produce records on the traces of which the refracted and direct waves tend to cancel, thus being recorded with low amplitudes, while reflected waves are recorded with relatively greater amplitudes than is the case with the usual recording system. It is a further object to record reflected waves arriving from certain directions with greater sensitivity than equal waves arriving from other directions. A still further object of our invention is to provide a recording system operating simultaneously with the surveying operation and supplying a set of composites of the seismic waves received by the various seismometers. Other and more detailed objects of our invention will become apparent as the description thereof proceeds.

The problem of recording the reflected waves is complicated by the fact that other seismic waves of far greater amplitude are acting on the seismometers during the recording period. As is well known in the art, surface waves, refracted waves, and other more or less random waves are generated by the explosion at E, Figure 1. These waves pass by the seismometers during the recording period and, in the simple arrangement shown in Figure 1, produce on the recorded traces large amplitude waves on which the reflected waves are superimposed. The presence of these random waves makes the distinguishing of reflected waves quite difficult. Thus, in Figure 2, it would be nearly impossible to pick a reflected wave in the initial part of the recording period.

It is well known that by proper spacing and connection of several seismometers, it is possible to discriminate strongly against these direct waves. For example, if two seismometers are placed in a radial line from the shot point at a spacing of a half wave length apart, and are connected in series, the direct waves actuate the two seismometers at 180° phase difference and hence cancel out in the resultant record. The same cancellation of these waves can be secured by using a greater number of seismometers placed closer together. This is due to the fact that all the direct waves are in general of a random nature. The summed responses of a number of instruments spaced at different points along the ground will discriminate against such waves, while reflected waves arriving nearly simultaneously will tend to add. This arrangement has maximum response to vertical waves, which becomes a grave disadvantage when the reflecting beds are steeply dipping. In such a case, the reflected waves strike each seismometer in turn and tend to be cancelled in the same way as the direct waves. Our system has the advantage that the direct waves can be sharply discriminated against, even when the dip of the reflecting strata is large. It also requires the use of fewer seismometers to obtain the same effective discrimination, as will be apparent from the description of the system.

Figure 2:
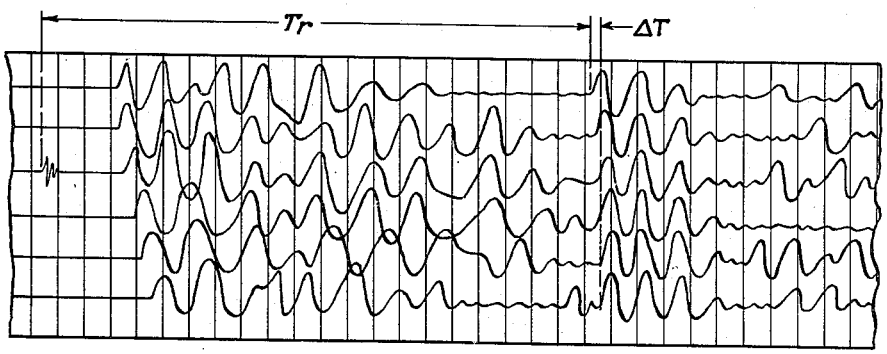
Figure 2 is a simplified representation of a seismic record taken with instruments set up as shown in Figure 1, and recorded in the usual way.

In Figure 2 it will be seen that the chief characteristic of the reflected wave as shown by the record of the seismometer responses is that for such a wave the responses of all instruments are nearly in phase, while the responses to other waves, such as surface waves or refracted waves, vary from trace to trace, and appear to have a much more random nature. If the output of all channels were added algebraically and plotted as a function of time, or if all outputs were connected in series with a recorder element and a record taken, much of the surface and refracted wave response would cancel out in the resultant trace, due to this random variation, while the amplitude of the reflected wave would be quite large, since the waves in all six channels are nearly in phase. In fact, if the top trace on the record were moved to the right by a distance corresponding to the time $\Delta T$, the next trace by a distance $4/5\Delta T$, the next by $3/5\Delta T$, etc., the sum of the traces would give an amplitude for that reflected wave equal to the sum of the maximum amplitudes of corresponding peaks on all six traces.

The process of moving over the traces and plotting the summed amplitudes can be replaced by a different setup in the recording system. Thus, by introducing a time lag $\Delta t$ into the amplifying system for the first trace, and corresponding decreasing lags into the following amplification channels, the responses to this reflected seismic wave are recorded in phase. By connecting all the outputs in series and recording the summed responses, a trace is produced exactly equivalent to the plotted wave. If, at the same time, a slightly different set of related time lags is introduced into a second system responsive to the seismometer outputs, and the outputs of these channels are added, there is still a large wave representing the reflected wave, but the amplitude is less than that on the former trace, because the reflected waves in the output of each amplification channel are slightly out of phase. The greater the difference of the time lags introduced from the correct value, the lower is the amplitude of the summed reflected wave. Hence, if the seismometer outputs are passed into several systems, in each of which different related values of time lag are introduced into the seismometer responses, and the amplified output of each system is summed electrically and recorded, there is one trace on which the reflected wave stands out most strongly. This trace is the one corresponding to the system having the nearest correct value of time lag, i. e., the nearest to total cancellation of the moveout of that particular reflected wave. Reflected waves with different moveouts naturally appear with maximum amplitudes on other traces.

It is evident that by this method of deliberately introducing related amounts of time delay from seismometer to seismometer, then recording on a trace the sum of the responses, using different delays from trace to trace, the reflected waves can be made to stand out in a marked degree from the other waves. A second point of importance is that the moveouts of the reflected waves can be determined by measuring and comparing the amplitudes of the summed waves from trace to trace. This principle of introducing simultaneously varying amounts of time delay in the recording process forms one important basis of our invention.

The recording system used can be considered as including: a number of seismometers spaced at definite (not necessarily equal) intervals on the ground, each of which is connected to an amplifying circuit, a temporary recording system or receptor for each seismometer, a number of pickups operating from the temporary recorder, and arranged in a definite system to produce a definite, varying time lag from pickup to pickup, a system of combining the outputs from one pickup on each temporary recorder so that the outputs from the seismometers are added together with a progressively decreasing time lag, amplifiers for each pickup system, and an oscillograph recorder. By this arrangement the waves on the first trace of the oscillograph record will represent the sum of all the seismometer outputs combined with time lags cancelling a moveout of, say, 0.010 second, those on the second trace will represent the sum of the outputs with a time lag cancelling a moveout of 0.008 second, and so on. Hence, if in a certain portion of the record a reflected wave is received which has a moveout of 0.008 second, it will appear at maximum amplitude on the second trace. In general, each reflected wave will appear on the record with amplitudes varying progressively from trace to trace, with a maximum on the trace corresponding to the moveout. It may be that the maximum value of the summed reflected wave does not occur on any trace, but falls between two traces. In such a case, the correct value of moveout can be determined by interpolation.

Figure 3:
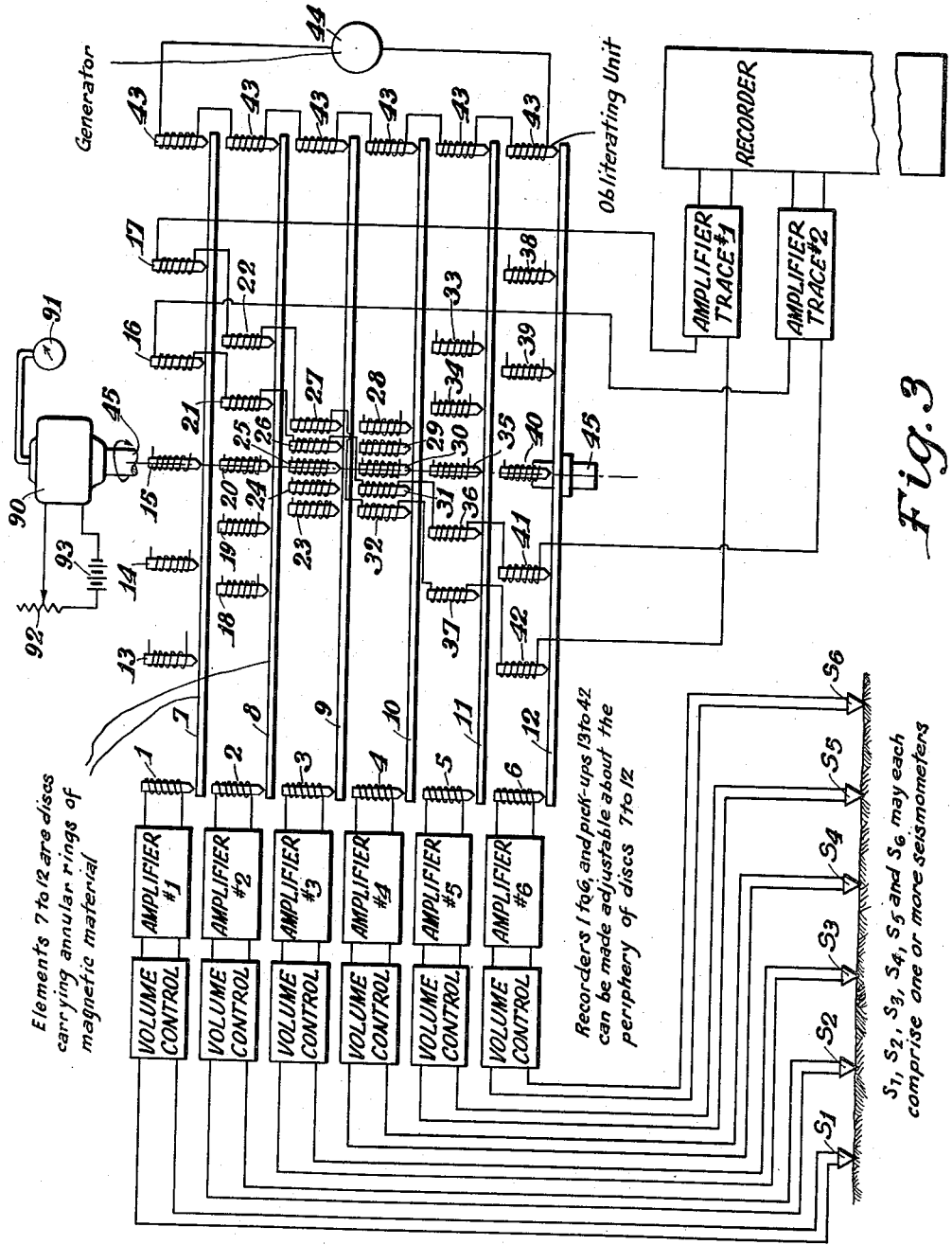
Figure 3 shows in diagrammatic form one embodiment of the recording system which is the basis of our invention.

One arrangment of equipment which embodies the invention is shown in diagrammatic form in Figure 3. The apparatus is conventional through the first set of amplifiers. Amplifiers 1 to 6 feed into magnetic recorders 1 to 6 respectively. These magnetic recorders, acting in response to the amplified seismometer outputs, magnetize thin strips of steel tape fastened to the circumferences of discs 7 to 12, which are revolved by shaft 45. Numerous forms of such magnetic recorders have been discussed since V. Poulsen's initial invention in 1900 which will permanently magnetize the moving tape so that the magnetic pattern of the tape will be a reproduction of the electrical output of the amplifier. The particular type of magnetic recording used in this system is not of importance; any of the systems known can be adapted to this use. Coils 13 to 42 represent diagrammatically the pickup units spaced about the circumferences of the discs which may be similar to the recorders 1 to 6. As the tape passes the pickups there is induced in the coils a voltage proportional to the magnetization of the tape, so that the voltage output of, say, coil 13 varies with time exactly the same as does the voltage output of amplifier 1. It is obvious from the figure that there will be a time lag between the inducing impulse through recorder 1 and the response of coil 13, which will be given by the tape distance between these two parts divided by the velocity of the tape. Thus, by suitably spacing the pickup units about the circumference of the disc and properly choosing the rotational speed of the discs, time lags of the desired amounts can be obtained.

These pickups are connected in such a manner that the output of any one set will combine the outputs of the seismometers with a definite, prearranged time lag introduced into the output of each seismometer. This time lag is that which will cancel a certain amount of move-out, so that in the summed output from the pickups the response of all seismometers to a reflected wave with that particular move-out will be in phase. This result is produced by spacing the pickup units in a way illustrated in Figure 3. Consider the set of pickups consisting of 17, 22, 27, 32, 37 and 42. Pickup 42 has the least time lag, 37 a little more, and so on. These pickups are connected in series, and their output actuates the amplifier for trace 1 of the oscillograph recorder. With this spacing and connection of units, the prerecording and pickup system will cancel a movement ΔT which is given by $$\Delta T = \frac{L}{V}$$

where L is the circumferential distance between the position of pickup 42 and pickup 17, and V is the linear velocity of the steel tape. Assuming equal seismometer spacing the intermediate pickups 22, 27, 32 and 37 are spaced at equal intervals between pickups 17 and 42.

Similarly, the set of pickups comprising 16, 21, 26, 31, 36 and 41 which are connected in series to the amplifier for trace 2 will cancel a move-out which is less than that of the first set, since the distance L between the positions of pickups 41 and 16 is less than that between 42 and 17. Again, the set comprising pickups 15, 20, 25, 30, 35 and 40 correspond to zero move-out since the pickups are all in line and have no relative time lag, while sets 14 ... 39 and 13 ... 38 correspond to negative moveouts. For simplicity in drawing, the connections between the sets of pickups are shown only for sets 17 ... 42 and 16 ... 41, since all are connected in the same way.

It is necessary to eliminate the previous magnetic record on the tape before passing it again through the recorder. Hence, at some point between the last pickup unit and the recording unit on each of magnetic recorders 1 to 7 is placed an obliterating unit 43. These units may be of either of two types. One type is similar to the recorders, but is fed with alternating current at a high frequency by generator 44, hence cancels the magnetic record in the same way that a permanently magnetized bar is demagnetized by passing it through an alternating current magnetic field. The other type is similar in structure but is supplied with direct current, and magnetically saturates the tape. The magnetic recorder then reduces the magnetization to its normal value during the recording period.

One important advantage of this obliterating process is that by its use it is unnecessary to make a permanent, complete seismometer response on one revolution of the disc. The periphery of the disc can be used over and over during the same recording period. Because of this the discs can be made much smaller than would be possible if there were no obliteration. It will be understood, however, that obliteration is not absolutely essential and that a record of great length can be formed without re-use during a single recording period.

Figure 4:
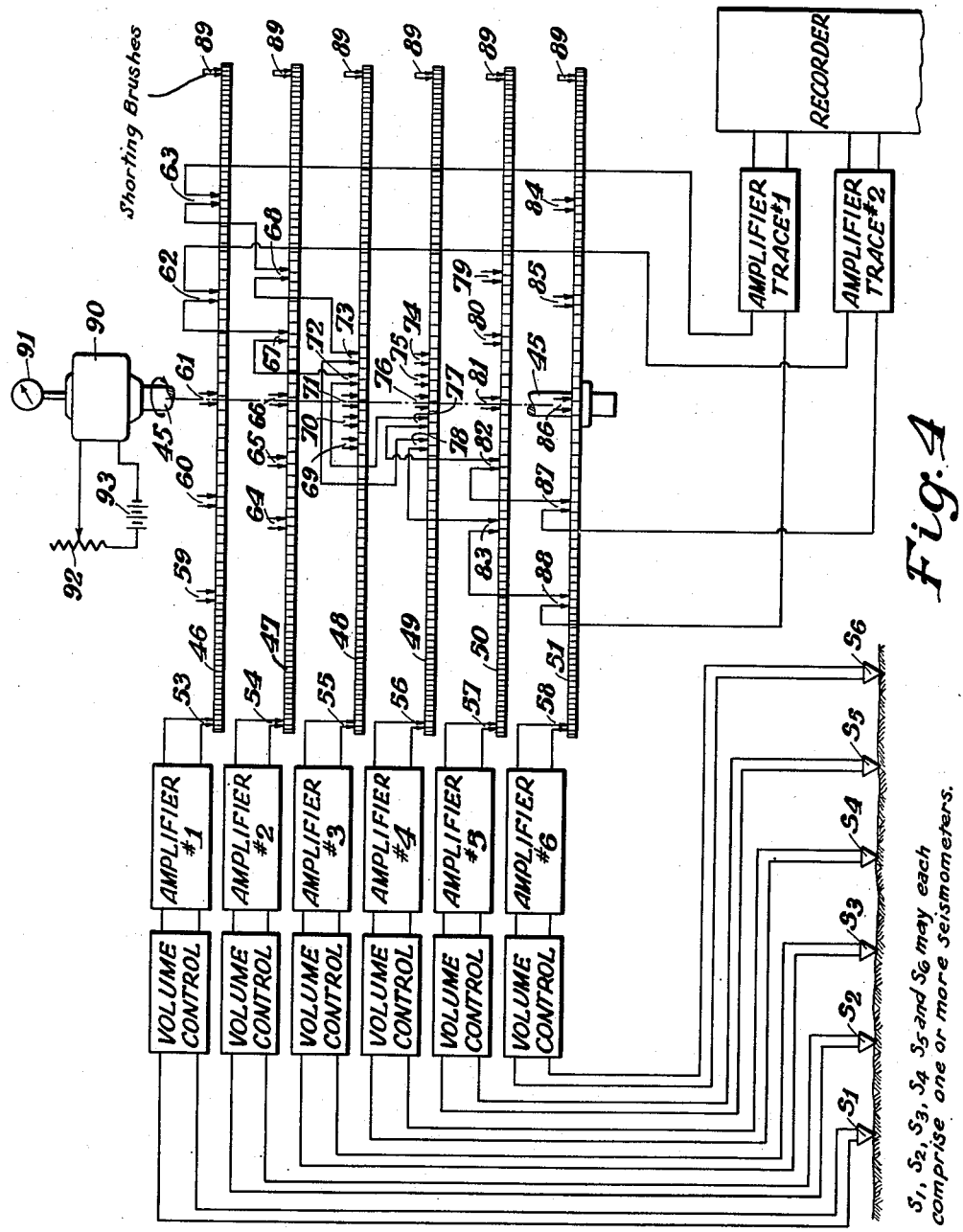
Figure 4 is a diagrammatic showing of an alternative recording system in accordance with our invention.
Figure 5:
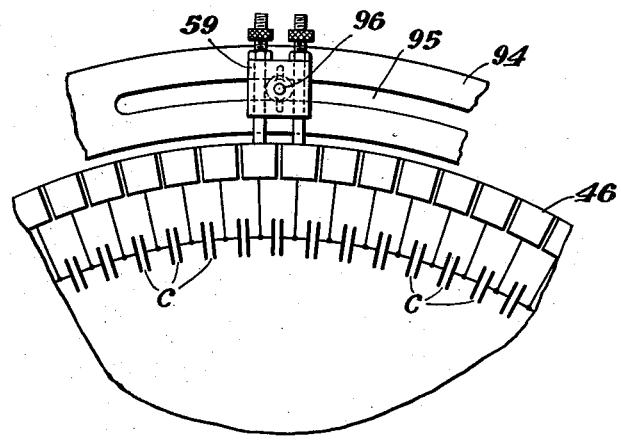
Figure 5 is a detail of a portion of Figure 4.

A second arrangement of equipment using a temporary recording disc of a different kind, is shown in Figures 4 and 5. With the exception of the temporary recorder unit, the recording system is the same as that shown in Figure 3. The temporary recorder makes use of a system of charging and discharging condensers rather than magnetizing and demagnetizing a steel tape. In Figure 4 discs 46, 47, 48, 49, 50 and 51 are rotated by shaft 45. The periphery of these discs is made up of insulated commutator segments, as shown in more detail in Figure 5. Between each two adjoining segments is connected a small condenser C. Condensers C have equal capacitances. The recorder elements 53, 54, 55, 56, 57 and 58 each consists of two conducting brushes which are connected to the output of the seismometer amplifiers, and which ride on the commutator segments of the discs. The two brushes are spaced one segment apart, so that they always rest on adjoining segments. As the discs rotate, these brushes are in momentary contact with each pair of segments and charge the small condensers to the average voltage difference between brushes during the time of contact.

Pickups 59 to 88 each consists of two brushes shaped and placed similarly to the recording units. These pickup units are divided into groups 59 ... 84, 60 ... 85, 61 ... 86, 62 ... 87, and 63 ... 88 with the same relative spacing between units as was discussed in connection with the magnetic pickup system. The pickup brushes in each group are connected in series although only two groups are shown so connected. Each group of pickups is connected into a circuit of high time constant, which may consist of a high resistance, such as a grid resistor in the input to the trace amplifiers. Thus, as the discs rotate, each group of brushes is charged from the disc condensers to nearly the same voltage applied across the condensers by the recording units.

Finally, spaced between the last pickup unit on each disc and the recorder there is a pair of shorting brushes 89 which discharge the disc condensers, hence perform the obliterating function already discussed.

The action of the recorder is obvious from the previous discussion on the magnetic system and from Figure 5. The rapidly rotating condenser system carries an electrostatic record of the seismometer responses, which becomes more and more accurate as the number of segments is increased. The pickup units are thus charged with a voltage varying with time in the same manner as the response of the seismometers, and with definite, predetermined time delays due to the pickup spacing. Because the segments are not spaced infinitely closely together and are not of infinitesimal size, the pickup voltages are "stepped" average values of the seismometer responses, but the inertia of the recording elements smooths out the resultant waves so that very little distortion is found.

The amplifiers for the recording unit may be of any type, since they only serve to increase the output from the sets of pickups to that necessary to actuate the oscillograph elements. The recorder contains, in addition to these elements, a device to print timing lines across the record in a manner well known to the art.

Since the time lags between pickups in a set depends not only on the spacing but also on the velocity of the discs, it is necessary to have some method of controlling and indicating or recording the speed of the disc system. This may be accomplished by motor 90 (Figures 3 and 4), equipped with tachometer 91, controlled by variable resistance 92 and supplied with energy by battery 93.

A recording indicator which puts an indication of the disc speed on the photographic record can be used. This may consist of a simple contactor arrangement so that at each complete revolution of shaft 45 a circuit is closed, momentarily displacing the light from one galvanometer element. If desired, the motor driving shaft 45 can be coupled through a clutch mechanism to the film drum so that the interval between timing lines will give an indication of the rotational speed of the discs.

Figure 6:
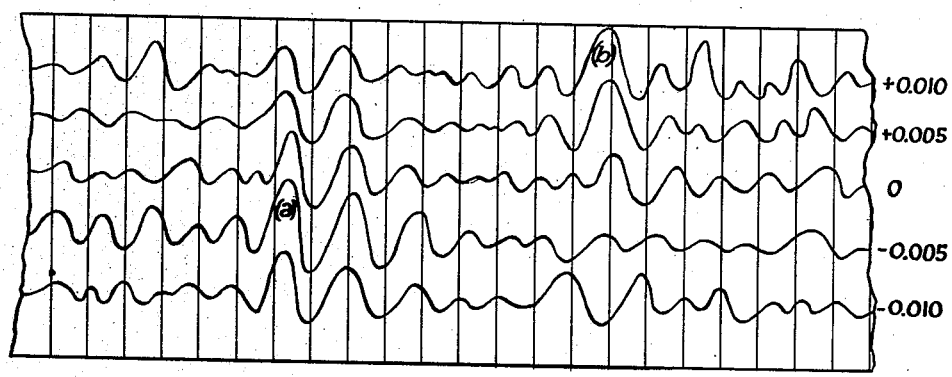
Figure 6 is a section of one type of record which can be obtained by the use of the recording systems shown in Figures 3 and 4.

The type of record produced by the recording system is shown in Figure 6. In this record it is assumed that the pickup spacing and disc velocity are such that the first trace corresponds to a moveout of +0.010 second, with succeeding traces corresponding to moveouts of +0.005, 0, —0.005 and —0.010 second respectively. In the section of record shown there are two reflected waves illustrated, the first (a) having a moveout of —0.005 second, the second (b) having a moveout of +0.0075 second.

Normally an impulse produced in the blasting circuit when the cap breaks will be superimposed on the output from one group of seismometers so that the instant of production of the seismic waves will be indicated on the oscillograph record.

There can be as many sets of summation pickups as there are oscillograph elements, and the intervals between the values of moveout can be any desired values.

One disadvantage in running all the temporary recording discs at the same speed will be evident from Figure 3. This is that on certain discs (in Figure 3, discs 9 and 10) the pickup units must of necessity be spaced quite close together. This can be eliminated if such discs are run at a higher speed relative to the remainder of the discs. In this case, the spacing of the units to produce a certain lag is increased in direct ratio to the increase in relative speed. In fact, if the discs were all run at different relative speeds which had a certain relation to each other, it would be possible to space all the pickups on each disc at the same relative distances around the circumference. The recorders would, of course, have to be respaced. The relative velocities can be produced by gearing the discs to the shaft, using ratios that speed up the inner discs so that in the particular system shown in Figure 3, discs 8 and 11 rotate faster than 7 and 12 and discs 9 and 10 faster than discs 8 and 11.

If the seismometers are not spaced equally, it is necessary to introduce greater or less delay, according to whether the instruments are moved farther apart or closer together. This can be arranged by moving the group of pickups associated with one disc (such as pickups 13 to 17 in Figure 3) away or towards the recorder, keeping the spacing between pickups the same. However, it is simpler merely to move the recorder itself, leaving the pickups in their prearranged condition.

Another condition commonly encountered in the field which can be quite advantageously met with this apparatus occurs if there is a difference in the thickness of the weathered layer below certain of the seismometers. The weathered layer is known to transmit seismic waves much slower than the consolidated beds below, hence any increase in relative thickness of this layer causes the reflected waves to be received later than they should at these instruments. Numerous ways are known in which this difference in weathering can be determined, using the customary system of recording. These methods can be applied equally well here, by connecting each pickup on the zero moveout set (in Figure 3, pickups 15, 20, 25, 30, 35 and 40) to a separate trace amplifier. Under this condition there is no relative time lag introduced on the output of any seismometer, which corresponds to the normal method of recording. Having determined the difference in time corresponding to the difference in thickness of weathered layer, the various recorders can be moved around the circumference of the disc towards or away from the pickups, compensating for the change in weathering by introducing a positive or negative time lag. The pickups can then be connected in the usual manner and the summed responses recorded. Using the customary method of recording, this compensation is impossible, which complicates the computation of records.

If it is found that the values of moveouts set on the prerecorder are inadequate for a particular set of reflections, the entire range can be shifted, and further records taken. Thus, if greater positive moveouts are to be investigated (say +0.020 to 0 rather than +0.010 to —0.010), the recorders on the upper discs (7, 8 and 9) are shifted to the left, recorders on the lower discs (10, 11 and 12) are shifted to the right. On the other hand, if it is desired to investigate the moveouts of a certain set of reflections more closely, it is only necessary to increase the speed of shaft 45. Thus, if moveouts of +0.010 to —0.010 were investigated at a certain shaft speed, moveouts of +0.005 to —0.005 would be determinable at twice this speed. The pickups are, of course, preferably arranged so that their positions can be adjusted at the will of the operator to introduce any desired time lags. This can be accomplished as shown in Figure 5 by a supporting frame 94 carrying a slot 95. Pickup 59 can be moved at will and is held in place by set screw 96. Similar arrangements are omitted from Figures 3 and 4 in the interests of simplicity.

It is obvious that either in the system of Figure 3 or in the system of Figure 4 more than one seismometer can be used with each amplifier. In fact, the advantages of the use of multiple seismometers are well known and we prefer to use several seismometers, suitably spaced with each of the input amplifiers. The apparatus leading to each of recorder elements 1 ... 6 (Figure 3) or 53 ... 58 (Figure 4) is referred to in the claims as an input channel. We prefer to use at least three and preferably at least five input channels and similarly at least three or preferably at least five recording discs and a like number of groups of pickups.

The composites made in accordance with our invention need not each correspond to all the seismometers in the system. In fact, one advantageous method of operation is to apply each group of pickups to the temporary records corresponding to a relatively few associated seismometers. We have found, for example, that applying a group of pickups to the first four seismometers of a spread, and other pickup groups to similar associated sets of seismometers, that we can produce records quite similar in nature to that shown in Figure 2 but with the reflected waves on each trace sharply accentuated. This type of record is advantageous, especially in regions where correlation of records is important. This follows from the fact that the "character" of each reflection, i. e. the peculiar variation of amplitude of the reflections from a certain bed that identify the reflection on a number of records, is better preserved when only a few seismometers spaced relatively close together are used in the composite. The interpretation of data from the resultant records is made in the customary manner.

Certain other variations and modifications of this recording system will be apparent to those skilled in the art. The particular embodiments of the invention shown are for purposes of illustration only, and do not limit the invention, which is defined in the appended claims which should be construed as broadly as the prior art will permit.

We claim:

1. In apparatus for use in reflection seismic surveying, a set of receptors for temporary records, means for impressing simultaneously on each of said receptors a record corresponding to waves produced by a seismometer or seismometers, the seismometer or seismometers being different for each receptor, a plurality of pickups associated with said receptors and arranged in a plurality of groups, each group comprising pickups associated with a plurality of said receptors, means for imparting related motions to all of said receptors, whereby a point on any one of said receptors moves from the position of the impressing means associated with said receptor successively past the positions of the pickups associated with said receptor, electrical means connecting the pickups of each of said groups in a common electrical circuit, and recording means electrically connected with said electrical connecting means for producing simultaneously a plurality of composite records, each of said composite records corresponding to the composited signals picked up by one of said groups of pickups.

2. In apparatus for use in reflection seismic surveying, a set of receptors for temporary records, means for impressing simultaneously on each of said receptors a record corresponding to waves produced by a seismometer or seismometers, the seismometer or seismometers being different for each receptor, a plurality of pickups associated with said receptors and arranged in a plurality of groups, each group comprising pickups associated with a plurality of said receptors, obliterating means associated with said receptors, means for rotating said receptors, whereby a point on any one of said receptors moves from the position of the impressing means associated with said receptor successively past the positions of the pickups associated with said receptor and the position of the obliterating means associated with said receptor, electrical means connecting the pickups of each of said groups in a common electrical circuit, and recording means electrically connected with said electrical connecting means for producing simultaneously a plurality of composite records, each of said composite records corresponding to the composited signals picked up by one of said groups of pickups.

3. In apparatus for use in reflection seismic surveying a set of circular receptors for temporary records, means for impressing simultaneously on each of said receptors a record corresponding to waves produced by a seismometer or seismometers, the seismometer or seismometers being different for each receptor, a plurality of pickups associated with said receptors and arranged in a plurality of groups, each group comprising pickups associated with a plurality of said receptors, means for obliterating temporary records which have been impressed on said receptors by said impressing means and picked up by said pickups, means for rotating all of said receptors whereby a point on any one of said receptors moves from the position of the impressing means associated with said receptor successively past the positions of the pickups associated with said receptor and the position of the obliterating means associated with said receptor and thence back to the position of the impressing means associated with said receptor, thus utilizing each of said receptors repeatedly during a single seismic surveying operation, electrical means connecting the pickups of each of said groups in a common electrical circuit, and recording means electrically connected with said electrical connecting means for producing simultaneously a plurality of composite records, each of said composite records corresponding to the composited signals picked up by one of said groups of pickups.

4. In apparatus for use in reflection seismic surveying, a set of receptors for temporary records, electromagnetic means for impressing simultaneously on each of said receptors a record corresponding to waves produced by a seismometer or seismometers, the seismometer or seismometers being different for each receptor, a plurality of electromagnetic pickups associated with said receptors and arranged in a plurality of groups, each group comprising pickups associated with a plurality of said receptors, electromagnetic means associated with each of said receptors for obliterating said records, means for imparting related motions to all of said receptors, whereby a point on any one of said receptors moves in a continuous path from the position of the impressing means associated with said receptor successively past the positions of the pickups associated with said receptor and the position of the obliterating means associated with said receptor, electrical means connecting the pickups of each of said groups in a common electrical circuit, and recording means electrically connected with said electrical connecting means for producing simultaneously a plurality of composite records, each of said composite records corresponding to the composited signals picked up by one of said groups of pickups.

5. In apparatus for use in reflection seismic surveying, a set of receptors, each of said receptors comprising an annular ring of magnetic material, means for impressing simultaneously on each of said annular rings a transient magnetic record corresponding to waves produced by a seismometer or seismometers, the seismometer or seismometers being different for each receptor, a plurality of electromagnetic pickups associated with said annular rings of said receptors and arranged in a plurality of groups, each group comprising pickups associated with a plurality of said receptors, obliterating means associated with each of said receptors constructed and arranged to remove from said annular rings said transient magnetic records impressed thereon by said impressing means and picked up therefrom by said pickups, means for imparting related rotary motions to all of said receptors whereby a point on any one of said annular rings moves from the position of the impressing means associated with said annular ring successively past the positions of the pickups associated with said annular ring and the position of the obliterating means associated with said annular ring and thence back to the position of the impressing means associated with said annular ring, thus utilizing each of said annular rings for the reception of transient magnetic records repeatedly during a single seismic surveying operation, electrical means connecting the pickups of each of said groups in a common electrical circuit, and recording means electrically connected with said electrical connecting means for producing simultaneously a plurality of composite records, each of said composite records corresponding to the composited signals picked up by one of said groups of pickups.

6. In apparatus for use in reflection seismic surveying, a set of receptors for temporary records, means for impressing simultaneously on each of said receptors a record corresponding to waves produced by a seismometer or seismometers, the seismometer or seismometers being different for each receptor, a plurality of pickups associated with said receptors and arranged in a plurality of groups, each group comprising pickups associated with a plurality of said receptors, means for imparting related motions to all of said receptors, whereby a point on any one of said receptors moves from the position of the impressing means associated with said receptor successively past the positions of the pickups associated with said receptor and whereby time lag effects are accomplished, means for adjusting the positions of said pickups to control at will the magnitudes of said time lag effects, electrical means connecting the pickups of each of said groups in a common electrical circuit, and recording means electrically connected with said electrical connecting means for producing simultaneously a plurality of composite records, each of said composite records corresponding to the composited signals picked up by one of said groups of pickups.

7. In apparatus for use in reflection seismic surveying, a set of receptors for temporary records, means for impressing simultaneously on each of said receptors a record corresponding to waves produced by a seismometer or seismometers, the seismometer or seismometers being different for each receptor, a plurality of pickups associated with said receptors and arranged in a plurality of groups, each group having one pickup for each of said receptors, means for imparting related motions to all of said receptors, whereby a point on any one of said receptors moves from the position of the impressing means associated with said receptor successively past the positions of the pickups associated with said receptor, electrical means connecting the pickups of each of said groups in a common electrical circuit, said related motions imparted to said receptors and the relative positions of said impressing means and said pickups being proportioned to introduce into the signals passing through the pickups of each group time lag effects adapted to cancel the time lag effects due to a given moveout, and recording means electrically connected with said electrical connecting means for producing simultaneously a plurality of composite records, each of said composite records corresponding to the composited signals picked up by one of said groups of pickups.

8. Apparatus for seismic surveying comprising a plurality of seismometers, a plurality of input channels each associated with at least one of said seismometers, means for impressing temporary records on receiving means, each of said impressing means being associated with one of said input channels, a set of means for receiving said temporary records, one such receiving means being associated with each of said impressing means, a plurality of pickups associated with said receiving means and arranged in groups, each group having one pickup for each of said receiving means, means connecting the pickups of each of said groups in a common electrical circuit, means for imparting related motions to all of said receiving means, whereby a point on any one of said receiving means moves from the position of the impressing means associated with said receiving means successively past the positions of the pickups associated with said receiving means, said related motions imparted to said receiving means and the relative positions of said impressing means and said pickups being proportioned to introduce into the signals passing to the pickups of each group time lag effects adapted to cancel the time lag effects due to a given moveout, said given moveout being different for the different groups of pickups, and recording means electrically connected with said electrical connecting means for producing simultaneously a plurality of composite records, each of said composite records corresponding to the composited signals picked up by one of said groups of pickups.

9. Apparatus according to claim 8 in which said input channels, said impressing means, said receiving means and said groups of pickups are each at least three in number.

10. Apparatus for seismic surveying comprising a plurality of seismometers, a plurality of input channels each associated with at least one of said seismometers, means for impressing temporary records on receiving means, each of said impressing means being associated with one of said input channels, a set of continuously moving, repeatedly usable means for receiving said temporary records, one such receiving means being associated with each of said impressing means, a plurality of pickups associated with said receiving means and arranged in groups, each group having one pickup for each of said receiving means, means connecting the pickups of each of said groups in a common electrical circuit, means for obliterating said temporary records from said receiving means, means for imparting related motions to all of said receiving means, whereby a point on any one of said receiving means moves from the position of the impressing means associated with said receiving means successively past the positions of the pickups associated with said receiving means and the position of the obliterating means associated with said receiving means and thence back to the position of the impressing means associated with said receiving means, said related motions imparted to said receiving means and the relative positions of said impressing means and said pickups being proportioned to introduce into the signals passing to the pickups of each group time lag effects adapted to cancel the time lag effects due to a given moveout, the given moveouts being different for the different groups of pickups, and recording means electrically connected with said electrical connecting means for producing simultaneously a plurality of composite records, each of said composite records corresponding to the composited signals picked up by one of said groups of pickups.

11. Apparatus for seismic surveying comprising a plurality of seismometers, a plurality of input channels each associated with at least one of said seismometers, electromagnetic means for impressing magnetic records on magnetizable receiving means, each of said impressing means being associated with one of said input channels, a set of magnetizable receiving means for said magnetic records, one such receiving means being associated with each of said impressing means, a plurality of electromagnetic pickups associated with said receiving means and arranged in groups, each group having one pickup for each of said receiving means, means connecting the pickups of each of said groups in a common electrical circuit, means for imparting related motions to all of said receiving means, whereby a point on any one of said receiving means moves from the position of the impressing means associated with said receiving means successively past the positions of the pickups associated with said receiving means, said related motions imparted to said receiving means and the relative positions of said impressing means and said pickups being proportioned to introduce into the signals passing to the pickups of each group time lag effects adapted to cancel the time lag effects due to a given moveout, said given moveout being different for the different groups of pickups, and recording means electrically connected with said electrical connecting means for producing simultaneously a plurality of composite records, each of said composite records corresponding to the composited signals picked up by one of said groups of pickups.

12. Apparatus for seismic surveying comprising a plurality of seismometers, a plurality of input channels each associated with at least one of said seismometers, means for impressing temporary records on a set of recording discs, each of said impressing means being associated with one of said input channels, a set of recording discs constructed and arranged for related rotation, one of said recording discs corresponding with each of said impressing means, a common drive for said recording discs to effect said related rotation, a plurality of pickups associated with said recording discs and arranged in groups, each group consisting of pickups associated with various recording discs, means connecting the pickups of each of said groups in a common electrical circuit, means for obliterating records impressed on said recording discs by said impressing means, said recording discs, said common drive, said impressing means, said pickups and said obliterating means being constructed and arranged so that a recording point on any one of said recording discs moves from the position of the impressing means associated with said recording disc successively past the positions of the pickups associated with said recording disc and the obliterating means associated with said recording disc and thence back to the position of said impressing means and so that time lags are introduced into the signals passing to the pickups of each group of such magnitude and sign as to cancel the time lag effects due to a given moveout, the given moveouts being different for the different groups of pickups, and recording means electrically connected with said electrical connecting means for producing simultaneously a plurality of composite records, each of said composite records corresponding to the composited signals picked up by one of said groups of pickups.

13. Apparatus for seismic surveying comprising a plurality of seismometers, a plurality of input channels each associated with at least one of said seismometers, means for impressing temporary records on receiving means, each of said impressing means being associated with one of said input channels, a set of receiving means for said temporary records, one for each of said impressing means, said set of receiving means comprising a set of recording discs carrying insulated commutator segments and a condenser bridging each pair of adjacent commutator segments, a plurality of pickups associated with said receiving means and arranged in groups, each group having one pickup for each of said receiving means, means connecting the pickups of each of said groups in a common electrical circuit, a common drive for said set of recording discs, said recording discs, said common drive, and said impressing means being constructed and arranged so that a recording point on any one of said recording discs moves from the position of the impressing means associated with said recording disc successively past the positions of the pickups associated with said recording disc, said related motions imparted to said recording discs and the relative positions of said impressing means and said pickups being proportioned to introduce into the signals passing to the pickups of each group time lag effects adapted to cancel the time lag effects due to a given moveout, the given moveouts being different for the different groups of pickups, and recording means electrically connected with said electrical connecting means for producing simultaneously a plurality of composite records, each of said composite records corresponding to the composited signals picked up by one of said groups of pickups.

JOSEPH DANIEL EISLER.
JOSEPH AUDLEY SHARPE.